July 15, 1958     H. D. WHITLOCK     2,843,767
ELECTROSTATIC GENERATOR
Filed March 19, 1956     2 Sheets-Sheet 1
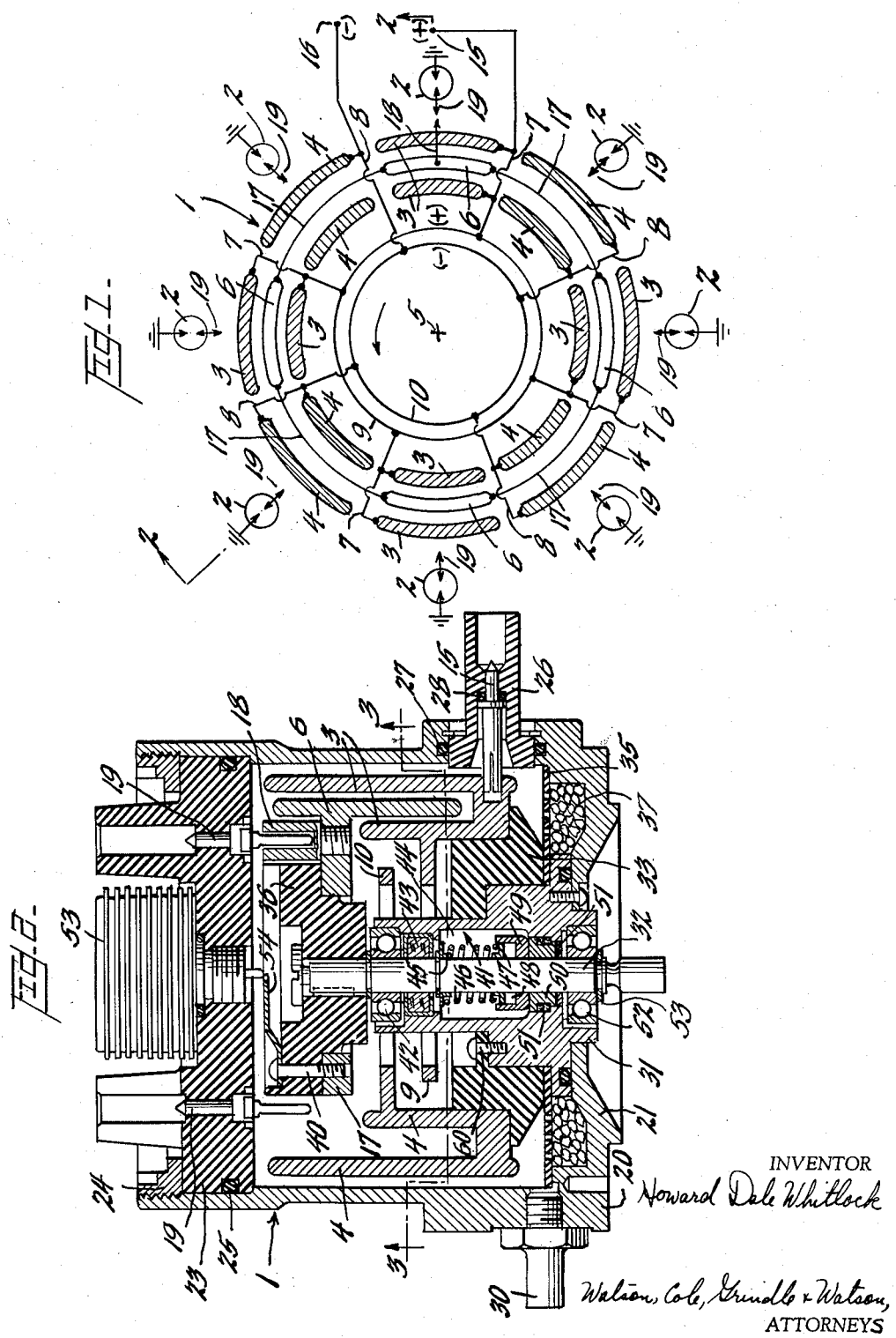
INVENTOR
Howard Dale Whitlock
Watson, Cole, Grindle & Watson,
ATTORNEYS July 15, 1958 H. D. WHITLOCK 2,843,767
ELECTROSTATIC GENERATOR
Filed March 19, 1956 2 Sheets-Sheet 2
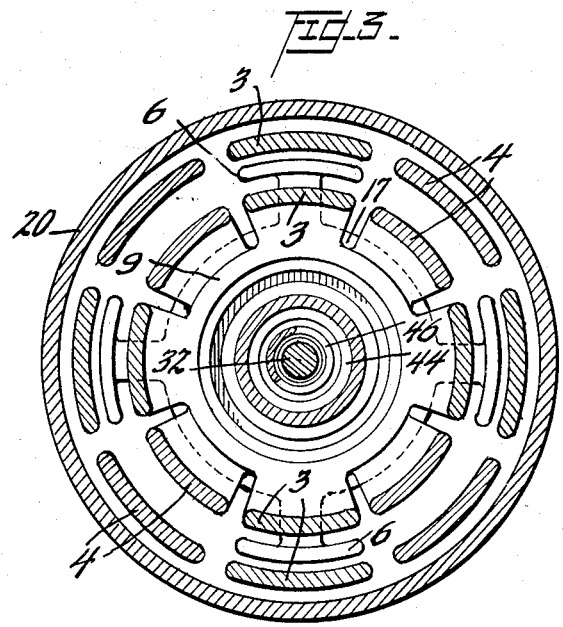
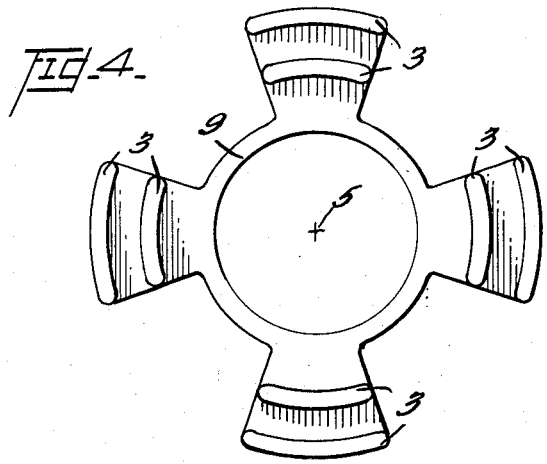
INVENTOR
Howard Dale Whitlock
BY Watson, Cole, Grindle & Watson,
ATTORNEYS

United States Patent Office 2,843,767
Patented July 15, 1958

2,843,767

ELECTROSTATIC GENERATOR

Howard D. Whitlock, Littleton, Colo., assignor to Heckethorn Manufacturing & Supply Co., Littleton, Colo., a corporation of Colorado Application March 19, 1956, Serial No. 572,410

9 Claims. (Cl. 310—6)

This invention relates to apparatus for generating high voltages, and in particular to an improved mechanical construction and disposition of the component parts of an electrostatic generator.

The novel generator construction disclosed herein is advantageously adapted for use in automotive ignition systems or the like employing electrostatic generators as a source of sparking potentials. From a generic aspect, however, the principles of this invention are also applicable to electrostatic generators adapted for other purposes and installations.

Within recent years, the substantial improvements in automotive and aircraft engines have resulted in considerable demand for improved ignition systems so that the optimum theoretical performance of these engines may be more nearly approached. Considerable recent activity has been directed to the development of improved ignition systems employing electrostatic generators as the source of the high potentials required for producing ignition sparks.

Broadly speaking, electrostatic generators suitable for ignition purposes are classifiable in two categories. Namely, those in which electrostatic charges are transported on a conveyor of insulating material with respect to associated inductors, and those in which the electrostatic charges are transported on a conductive conveyor with respect to the associated inductors. Generators belonging to each of the foregoing classifications possess different electrical characteristics and are also capable of varied and unique mechanical constructions.

In order to attain voltage and current characteristics suitable for ignition purposes it has heretofore been necessary to connect a plurality of electrostatic generators in cascade. Various arrangements have been proposed in which electrostatic generators of both types have been operatively associated with respect to one another. For example, the copending application of Noel Felici, Roger Morel and Marcel Point, Serial No. 492,496, filed March 7, 1955, now abandoned, for "Quick Starting Electrostatic Generator" discloses a system in which three electrostatic generators are connected in cascade with respect to one another. The individual generator units of this arrangement are aptly termed primer, exciter, and main generators in view of the functions performed. More particularly, the main generator supplies directly the energy required for establishing the ignition sparks, and the exciter generator supplies an exciting potential to the main generator inasmuch as the main generator is not self-exciting. The primer generator primes the exciter generator momentarily so that thereafter the exciter generator is self-exciting.

There is disclosed herein a detailed structural arrangement for fabricating a main generator of the conductive-conveyor type. Main generators suitable for ignition purposes have been previously disclosed in the art. Inasmuch as the present research directed to the application of electrostatic principles to ignition systems indicates that optimum performance can only be attained through the employment of a plurality of generators in cascade, in the usual instance three generators, considerable effort is now being expended in an attempt to simplify the generator components so that they may be fabricated more easily and economically. Moreover, notwithstanding the fact that the generation of high voltages has traditionally required a relatively large spacing of generator components, it is now realized that any practical ignition system incorporating electrostatic generators must necessarily have a compact disposition of components in view of the limited space available in the engine compartments of modern automobiles and aircraft.

Accordingly a principal object of this invention is to provide an improved construction for an electrostatic generator of conductive-conveyor type in which the conveyor and inductor components are more easily and economically fabricated by modern production techniques, and also readily assembled in their operative position with respect to one another.

Another object of this invention is to provide an improved construction for an electrostatic-generator of the conductive-conveyor type which is adapted for a compact arrangement of components resulting in optimum use of the available space.

Another object of this invention is to improve the structural arrangement of the components of electrostatic generators, and particularly those of the type employing a confined dielectric gas.

Another object is to provide an improved main generator design which is physically independent of the priming and exciting generator units.

As is well known, a conductive-conveyor electrostatic generator is operative in response to the relative movement of a set of metallic conveyor plates with respect to closely associated inductors. A principal novel feature of this invention is directed to the mechanical construction and operative disposition of these components.

In a preferred embodiment, the inductors are mechanically divided into two separate inductor sets. Each set comprises a plurality of circularly disposed inductors in which adjacent inductors are spaced sufficiently from one another to receive therebetween a single inductor of the other set. All of the inductors of each set are mechanically coupled to the other inductors of that set by a circular ring. The circular ring also serves as the electrical conductor for appropriately interconnecting the inductors of that set. The two inductor sets are operatively positioned with respect to one another by meshing the inductors of one set with the inductors of the other set. By appropriate manufacturing technique, each inductor set may be fabricated as a single mechanical unit by molding or the like, whereby the time consuming assembly and connection of individual inductor plates may be avoided.

Each inductor plate is preferably formed in a generally U-shaped construction which defines a path of movement for the conveyors between the individual legs or parts of the U. This U-shaped construction has been previously disclosed in the copending application of Noel Felici and Marcel Point, Serial No. 492,495, filed March 8, 1954, for "Electrostatic Generator Capable of Rapid Build-up of Potential."

The conveyors are also preferably formed and mechanically linked together in the appropriate electrical connection by fabricating the conveyors and interconnecting conductors in a single mechanical unit. Accordingly, the conveyors may also be easily and economically fabricated and assembled.

A gas seal assembly is usually required in most small size electrostatic generators in order to contain a dielectric gas within the generator housing and to prevent its escape around the drive shaft which extends into the housing to rotate the conveyors. Another feature of this invention which advantageously cooperates with the foregoing inductor and conveyor arrangement to provide for a more compact generator structure is the particular construction and disposition of the gas seal assembly within the central bore of the generator defined by these circularly disposed inductors and conveyors.

Heretofore the gas seal assembly was disposed at one end of the generator housing and collaring the drive shaft at an area removed from the inductors and conveyors. This arrangement necessarily resulted in an elongated housing of an undesirably large size.

In order that all of the structural features for attaining the objects of this invention may be readily understood, reference is herein made to the accompanying drawings wherein:

Figure 1 is a schematic diagram showing the electrical connection and significance of the structural generator components shown in Figure 2, Figure 2 is a longitudinal sectional view of a preferred embodiment of the novel generator construction of this invention taken along lines 2—2 of Figure 1, and adapted for a connection of components in accordance with diagram of Figure 1, Figure 3 is a sectional view taken along lines 3—3 of Figure 2 and showing in some detail the mechanical construction and disposition of the inductors and conveyors, and Figure 4 is a plan view of a single inductor set.

The schematic diagram of Figure 1 discloses in simplified form the electrical connection of the principal components of a conductive-conveyor generator 1 in an ignition application for sequentially energizing a plurality of spark plugs 2. The circuit arrangement as shown is generally conventional or disclosed in certain detail in current pending patent applications. Reference to a specific circuit arrangement is made herein, however, in order that the electrical functioning and connections of the novel generator structure shown in Figure 2 may be readily understood.

In Figure 1, two sets of arcuate inductors are disposed in an interspersed space relationship about an axis of rotation. A first set comprising inductors 3 is disposed on a first diameter through the axis 5, and the interspersed set comprising inductors 4 is disposed on a diameter forming a 45° angle to the diameter of the adjacent inductors of set 3. The individual inductors 3 and 4 of the respective sets each comprise two spaced parts which define therebetween the path of rotation for a plurality of conveyors 6. The arcuate extent and spacing of the conveyors from each other are such that there is one conveyor 6 provided for a pair of inductors 3, 4. In particular, with the relative positioning of the conveyors and inductors shown in the drawing, the parts of every other inductor sandwich an individual conveyor therebetween, with the conveyor path between the other inductors being vacant. Inasmuch as the conveyors 6 are mechanically ganged to one another, each of the conveyors pass between the adjacent parts of all of the inductors for every revolution of the conveyors about the axis of rotation 5.

The mating inner and outer parts of each inductor 3 are electrically connected together by conductors 7, and the mating inner and outer parts of each inductor 4 are electrically connected together by conductors 8. Accordingly, the two parts of each inductor assume the same polarity and potential. The inductors of set 3 are electrically connected together in multiple by ring conductor 9, and the inductors of set 4 are electrically connected together in multiple by ring conductor 10.

The input potentials for operatively exciting generator 1 are applied to ring conductors 9 and 10. In particular, high voltage input terminals 15 and 16 are connected to an external potential source (not shown) which provides both positive and negative high voltages with respect to ground. In an ignition application, these high voltages may be advantageously obtained from a primer-exciter electrostatic generator.

Conveyors 6 are directly connected one to the other by means of conductors 17. It should be noted that conveyors 6 and conductors 17 are not connected to any of the other generator components, and therefore the conveyors may be considered to float potentialwise with respect to the associated components.

A conducting finger 18 is directly connected to the ring comprising conveyors 6 and conductors 17. As will be hereinafter outlined in detail, conducting finger 18 is mechanically coupled to one of the conveyors 6 in such a manner that the finger rotates synchronously with the set of conveyors. A plurality of circularly disposed charge transfer elements 19, one for each inductor 3 or 4, is positioned in spark gap relationship with respect to finger 18 in such a manner that finger 18 becomes sequentially associated with each of the transfer elements 19. Each transfer element 19 is directly connected to ground through a different spark plug 2.

For reasons hereinafter outlined in detail, the output of the generator appears at conducting finger 18 in the form of a relatively high voltage. As the finger 18 becomes closely associated with each charge transfer element 19, a current surge to ground is developed which produces a suitable ignition spark between the electrodes of the associated spark plug 2.

The operation of the foregoing generator structure to activate spark plugs 2 is briefly as follows. In response to the closure of the ignition and starter switches of an automobile or the like, positive and negative high voltages are applied between terminals 15 and 16 and ground by structure not material to the invention herein claimed. The positive high voltage applied to terminal 15 causes inductors 3 to assume a relatively high potential, and the negative high voltage applied to terminal 16 causes inductors 4 to assume a relatively high negative potential. Assuming the relative positioning of conveyors 6 shown in Figure 1, a relatively intense negative charge is induced thereon inasmuch as each conveyor is sandwiched between parts of a positively charged inductor.

As the conveyors 6 advance in their path of rotation to a position between the adjacent parts of each inductor 4, the negative charge of the conveyors is now subjected to the repulsive negative field existing between the parts of each inductor 4. This field causes the positive charge on the conveyors 6 to break down the gap existing between conducting finger 18 and the associated charge transfer element 19, thereby energizing the spark plug 2 connected thereto. This operation creates a substantial current flow which ultimately causes the conveyors to assume a positive charge.

As the now positively charged conveyors advance to the inductors 3, the repulsive positive field established therebetween, causes a breakdown in the spark gap between conducting finger 18 and the next charge transfer element 19 in the sequence and also the associated spark plug 2. The resulting current surge through these gaps ultimately causes the conveyors to assume a negative charge. It should be noted that alternate spark plugs are subjected to a sparking potential of one polarity, and the intermediate spark plugs are subjected to a sparking potential of the opposite polarity.

A detailed structural arrangement showing the novel form and disposition of certain component parts of a practical generator construction following the schematic of Figure 1 is disclosed in the longitudinal sectional view of Figure 2. It should be noted, as is shown in Figure 1, that the sectional view is taken at a 135° angle formed between the lines 2—2 which join at the axis of rotation 5 for the generator.

Most of the components for generator 1 are enclosed within the body of a generally cylindrical metallic housing 20 which is formed with an end wall 21 partially closing the bottom end of the housing cylinder. A cap 23 fabricated of insulating material closes the upper end of the hollow cylinder of housing 20. Inside ring nut 24 fixedly locks cap 23 to housing 20, and sealing ring 25 establishes a fluid tight seal between the edge surface of cap 23 and the inside wall of the cylinder of housing 20.

Insulator 26 supporting high-voltage input terminal 15 passes through a hole formed in the wall of the cylinder of housing 20. Sealing ring 27 establishes a fluid tight seal between the housing and insulator support 26, and sealing ring 28 establishes a fluid tight seal between terminal 15 and insulator support 26. The section view shows only a single input terminal 15 which is connected to the set of inductors 4. An identical second input terminal and insulator support corresponding with the terminal 16 shown in Figure 1 is supported by housing 20 in a position not shown in the particular sectional view taken.

A metallic bearing mount 31 is supported on end wall 21 of housing 20. This mount is generally cylindrical and is formed with a hollow bore through which drive shaft 32 extends. Inductor mount 33 which is fabricated of insulating material is fixedly coupled to bearing mount 31 by a plurality of circularly disposed screws 60.

Inductors 3 and 4 are fabricated in individual sets which are both supported by the shoulder formed in inductor mount 33. The cross-sectional form of each of the inductors of both sets assumes a generally U-shape as is shown in Figure 2 with respect to inductor 3. A plan view of the set of inductors 3 is shown in Figure 4. The inductors are circularly disposed and are mechanically attached to a center ring 9 which gangs the individual inductors one to the other. Center ring 9 in a preferred embodiment is fabricated of metal, and therefore the ring also electrically connects the inductors one to the other as is required for generator operation.

The set of inductors 4 assumes a mechanical configuration identical with the construction shown in Figure 4 with respect to the set of inductors 3, with the exception that ring 10 which mechanically supports and electrically connects the individual inductors 4 to one another is disposed above ring 9 as is best shown in Figure 2. This relative positioning of rings 9 and 10 is required in order that the individual inductors of one set may be positioned so as to mesh with the individual inductors of the other set as is shown in the sectional view of Figure 3.

It may be readily appreciated, that the particular structural arrangement provided for the inductors of the generator disclosed herein is advantageously adapted for economical fabrication, and also easy and economical installation with respect to the associated generator components. For example, the individual inductors of each set, together with their connecting ring may be molded or fabricated as a single unit, thereby eliminating the individual fabrication of inductor plates and the individual mounting and connections heretofore commonplace.

Rotor 36 is coupled to the upper portion of drive shaft 32 and rotates in correspondence with the shaft. Conveyors 6, which are mechanically coupled to one another by a ring 17, which is preferably metallic, are fastened to rotor 36 by a plurality of circularly disposed screws 40. In the sectional view of Figure 2, a conveyor plate 6 is shown disposed between the adjacent parts of inductor 3, whereas the space between the adjacent parts of inductor 4 is vacant inasmuch as the sectional view is taken at a 135° angle. A plan view of the mechanical structure comprising conveyors 6 and ring 17 is best shown in Figure 3. It should be noted that as in the case with the inductor sets, the construction of conveyors 6 and ring 17 is conducive to an integral fabrication which is economical and easy to install.

In view of the relatively compact construction of the generator, housing 20 is preferably charged with a pressurized dielectric gas supplied through valve 30. This dielectric gas effectively suppresses the sparking which would otherwise occur due to the relatively small spacing between components of the generator. It is obvious, of course, that the generator housing must contain this gas without loss of substantial pressure in order to provide satisfactory generator performance over a relatively long period. The insertion of drive shaft 32 through the housing in order to rotate conveyors 6, introduces at the point of insertion an area at which gas leakage is likely to occur.

Gas seal assemblies have heretofore been employed to collar the shaft in the area extending through the housing wall. The inductor and conveyor arrangement herein disclosed, is conducive to placement of gas seal assembly 41 inside the main generator housing, and in particular substantially within the bore defined by the circularly disposed inductors and conveyors. This arrangement results in optimum use of the space inside the generator housing and permits a shorter overall generator unit. That is, in the usual generator constructions of the prior art the gas seal assembly has been removed from the center of the inductor and conveyor components thereby resulting in a construction which is relatively elongated and space consuming.

The gas seal assembly herein comprises a set of ball bearings 42 which is mounted immediately below rotor 36, thereby assuring close alignment of the rotating conveyors 6 with respect to the stationary inductors 3 and 4. This arrangement also permits close alignment between the single conducting pin or finger 18 which is in a spark gap relationship with eight circularly disposed charge transfer elements 19 mounted on cap 23. The elements 18 and 19 of Figure 2 correspond in function with the conducting finger 18 and charge transfer elements 19 of the schematic of Figure 1.

A top oil seal 43 is mounted directly below bearings 42 and prevents the oil within space 44 and used in the seal assembly from leaking upward and entering the generator housing. A snap ring and washer 45 serves as a seat for a coil spring 46 which presses against a similar washer 47, which in turn presses gasket 48 to form a tight seal between seal cup 49 and shaft 32. Seal cup 49 is pressed against seal face 50 to form an oil tight rotating seal. Gasket 51 establishes an oil tight seal between bottom seal face 50 and seal chamber housing 31. The set of bearings 52 serve to align the drive shaft 32 to absorb any thrust that may be placed on the bottom of the drive shaft. Retaining ring 53 holds the bearing assembly in place.

The bottom edge surface of inductor mount 33 rests upon a cover plate 35 which is perforated so that activated alumina pellets 37 may actively absorb the deleterious gaseous products formed within the housing due to sparking of the generator components and the release of moisture or the like.

Components 53 and 54 comprise a shut-off solenoid assembly which serves to abruptly terminate the output from the generator. The details of this subcombination are set forth in the copending application of Donald W. Kreuthmeir, filed January 23, 1956, Serial No. 560,687.

It is to be understood that the above-described arrangements are illustrative of the applications of the principles of this invention. Numerous other arrangements may be devised by those skilled in the art without departing from the scope of the invention.

Having thus described the invention, what is claimed as new and desired to be secured by Letters Patent is:

1. In a conductive-conveyor electrostatic generator, the improvement comprising two sets of inductors, each set including a plurality of circularly disposed inductors of arcuate form circumferentially spaced from one another sufficiently to receive a single inductor of the other set therebetween, a pair of rigid conductive rings one for each set and each positioned within the circle of inductors of that set and mechanically supported in a fixed position and electrically connecting the inductors of that set with respect to one another, and an inductor mount supporting the two sets in a common circle with the individual inductors of one set being interposed in the spaces between the inductors of the other set.

2. In a conductive-conveyor electrostatic generator, the improvement comprising two sets of inductors, each set including a plurality of circularly disposed inductors of arcuate form circumferentially spaced from one another sufficiently to receive a single inductor of the other set therebetween, a pair of rigid conductive rings one for each set and each positioned within the circle of inductors of that set and mechanically supported in a fixed position and electrically connecting the inductors of that set with respect to one another, said inductors and ring of each set being formed as an integral unit separable from the integral unit of the other set, and an inductor mount supporting the two sets in a common circle with the individual inductors of one set being interposed in the spaces between the inductors of the other set.

3. In a conductive-conveyor electrostatic generator, the improvement comprising two sets of inductors, each set including a plurality of circularly disposed inductors circumferentially spaced from one another sufficiently to receive a single inductor of the other set therebetween, a pair of rigid conductive links one for each set and each positioned adjacent the circle of inductors of that set and mechanically supported in a fixed position and electrically connecting the inductors of that set with respect to one another, and means supporting the two sets in a common circle with the individual inductors of one set being interposed in the spaces between the inductors of the other set.

4. In a conductive-conveyor electrostatic generator, the improvement comprising two sets of inductors, each set including a plurality of circularly disposed inductors of arcuate form circumferentially spaced from one another sufficiently to receive a single inductor of the other set therebetween, a pair of rigid conductive rings one for each set and each positioned adjacent the circle of inductors of that set and mechanically supported in a fixed position and electrically connecting the inductors of that set with respect to one another, and an inductor mount supporting the two sets in a common circle with the individual inductors of one set being interposed in the spaces between the inductors of the other set.

5. In a conductive-conveyor electrostatic generator, the improvement comprising two sets of inductors, each set including a plurality of circularly disposed inductors of arcuate form circumferentially spaced from one another sufficiently to receive a single inductor of the other set therebetween, a pair of rigid conductive rings one for each set and each positioned within the circle of inductors of that set and mechanically supported in a fixed position and electrically connecting the inductors of that set with respect to one another, an inductor mount supporting the two sets in a common circle with the individual inductors of one set being interposed in the spaces between the inductors of the other set, a plurality of circularly disposed conveyors electrostatically coupled to both sets of inductors, a rigid conductive ring positioned within the circle of conveyors and mechanically supporting in a fixed position and electrically connecting the conveyors with respect to one another, and means for rotatively moving the conveyors and inductors with respect to one another.

6. In a conductive-conveyor electrostatic generator, the improvement comprising two set of inductors, each set including a plurality of circularly disposed inductors of arcuate form circumferentially spaced from one another sufficiently to receive a single inductor of the other set therebetween, a pair of rigid conductive rings one for each set and each positioned within the circle of inductors of that set and mechanically supported in a fixed position and electrically connecting the inductors of that set with respect to one another, said inductors and ring of each set being formed as an integral unit separable from the integral unit of the other set, an inductor mount supporting the two sets in a common circle with the individual inductors of one set being interposed in the spaces between the inductors of the other set, a plurality of circularly disposed conveyors electrostatically coupled to both sets of inductors, a rigid conductive ring positioned within the circle of conveyors and mechanically supporting in a fixed position and electrically connecting the conveyors with respect to one another, said conveyors and ring therefor being formed as an integral unit separable from the integral units of the inductor sets, and means for rotatively moving the conveyors and inductors with respect to one another.

7. In a conductive-conveyor electrostatic generator, the improvement comprising two sets of inductors, each set including a plurality of circularly disposed arcuate inductors of generally U-shaped cross-sectional form circumferentially spaced from one another sufficiently to receive a single inductor of the other set therebetween, a pair of rigid conductive rings one for each set and each positioned within the circle of inductors of that set and mechanically supported in a fixed position and electrically connecting the inductors of that set with respect to one another, an inductor mount supporting the two sets in a common circle with the individual inductors of one set being interposed in the spaces between the inductors of the other set, a plurality of circularly disposed conveyors electrostatically coupled to both sets of inductors and movable in a path between the leg parts of the U-shaped inductors, a rigid conductive ring positioned within the circle of conveyors and mechanically supporting in a fixed position and electrically connecting the conveyors with respect to one another, and means for rotatively moving the conveyors and inductors with respect to one another.

8. In a conductive-conveyor electrostatic generator, the improvement comprising two sets of inductors, each set including a plurality of circularly disposed inductors of arcuate form circumferentially spaced from one another sufficiently to receive a single inductor of the other set therebetween, a pair of rigid conductive rings one for each set and each positioned within the circle of inductors of that set and mechanically supported in a fixed position and electrically connecting the inductors of that set with respect to one another, an inductor mount supporting the two sets in a common circle with the individual inductors of one set being interposed in the spaces between the inductors of the other set, a plurality of circularly disposed conveyors electrostatically coupled to both sets of inductors, a rigid conductive ring positioned within the circle of conveyors and mechanically supporting in a fixed position and electrically connecting the conveyors with respect to one another, a housing enveloping the foregoing components, a drive shaft extending through said housing and passing through said inductor mount and coupled to said conveyor ring to rotate said conveyors relative to the inductors, and a gas seal and bearing assembly collaring said shaft and positioned substantially within the bore defined by said inductor mount and said circularly disposed inductors and conveyors.

9. In a conductive-conveyor electrostatic generator, the improvement comprising two sets of inductors, each set including a plurality of circularly disposed inductors of arcuate form circumferentially spaced from one another sufficiently to receive a single inductor of the other set therebetween, a pair of rigid conductive links one for each set and each positioned adjacent the circle of inductors of that set and mechanically supported in a fixed position and electrically connecting the inductors of that set with respect to one another, an inductor mount supporting the two sets in a common circle with the individual inductors of one set being interposed in the spaces between the inductors of the other set, a plurality of circularly disposed conveyors electrostatically coupled to both sets of inductors, a rigid conductive link positioned adjacent the circle of conveyors and mechanically supporting in a fixed position and electrically connecting the conveyors with respect to one another, a rotor, a drive shaft extending through said inductor mount and having one end thereof coupled to said conveyors through said rotor, a gas seal and bearing assembly collaring said shaft and positioned substantially within the bore defined by said inductor mount and said circularly disposed inductors and conveyors and extending to said rotor, and housing for the foregoing generator structure containing a dielectric gas.

No references cited.